United States Patent
Kim et al.

(10) Patent No.: US 11,831,218 B2
(45) Date of Patent: Nov. 28, 2023

(54) MOTOR HAVING AN IMPELLER AND A PRINTED CIRCUIT BOARD

(71) Applicant: LG Electronics Inc., Seoul (KR)

(72) Inventors: Jaeho Kim, Seoul (KR); Sunghyun Kim, Seoul (KR); Kyungho Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 72 days.

(21) Appl. No.: 17/155,889

(22) Filed: Jan. 22, 2021

(65) Prior Publication Data

US 2021/0288549 A1    Sep. 16, 2021

(30) Foreign Application Priority Data

Mar. 16, 2020    (KR) .......................... 10-2020-0032203

(51) Int. Cl.
*H02K 5/22*    (2006.01)
*H02K 9/06*    (2006.01)

(52) U.S. Cl.
CPC ............... *H02K 5/225* (2013.01); *H02K 9/06* (2013.01); *H02K 2211/03* (2013.01)

(58) Field of Classification Search
CPC ...... H02K 5/225; H02K 9/06; H02K 2211/03; H02K 5/20; H02K 5/207; H02K 9/02; H02K 9/04; H02K 2203/03
See application file for complete search history.

(56) References Cited

U.S. PATENT DOCUMENTS

| 10,517,448 B2 * | 12/2019 | Shiozawa ................ A47L 5/22 |
| 2007/0247009 A1 | 10/2007 | Hoffman et al. |
| 2009/0189492 A1 * | 7/2009 | Horng .................... H02K 1/185 |
| | | 310/67 R |

(Continued)

FOREIGN PATENT DOCUMENTS

| CN | 105846609 A * | 8/2016 | ............... H02K 5/20 |
| CN | 109276183 | 1/2019 | |

(Continued)

OTHER PUBLICATIONS

Yamamoto, Machine Translation of JP2008312272, Dec. 2008 (Year: 2008).*

(Continued)

*Primary Examiner* — Eric Johnson
(74) *Attorney, Agent, or Firm* — Fish & Richardson P.C.

(57) ABSTRACT

A motor includes: an inner housing defining an accommodation space, an outer housing defining a flow path with the inner housing, an impeller disposed at a first side of the inner housing, a power portion that is disposed in the accommodation space and that includes a rotation shaft coupled to the impeller so as to be rotated together with the impeller, a bracket coupled to the inner housing at a second side of the inner housing and rotatably supporting the rotation shaft, and a printed circuit board (PCB) that is spaced apart from the bracket by a predetermined distance and that is electrically connected to the power portion. A circumference of the PCB includes a plurality of concave portions that are spaced apart from each other, and the plurality of concave portions are recessed toward a center of the PCB.

14 Claims, 21 Drawing Sheets

(56) References Cited

U.S. PATENT DOCUMENTS

| | | | | |
|---|---|---|---|---|
| 2012/0039729 | A1* | 2/2012 | Horng | H02K 9/223 |
| | | | | 310/65 |
| 2012/0313467 | A1* | 12/2012 | Omae | B62D 5/0406 |
| | | | | 310/71 |
| 2015/0351599 | A1* | 12/2015 | Park | F04D 29/541 |
| | | | | 310/68 B |
| 2017/0170709 | A1 | 6/2017 | Barnes et al. | |
| 2018/0262092 | A1* | 9/2018 | Beyerl | H02K 11/215 |
| 2019/0082917 | A1* | 3/2019 | Shiozawa | H02K 3/522 |

FOREIGN PATENT DOCUMENTS

| | | |
|---|---|---|
| CN | 109565232 | 4/2019 |
| JP | 2004-007867 | 1/2004 |
| JP | 2008312272 | 12/2008 |
| JP | 2014-150709 | 8/2014 |
| JP | 2019054671 | 4/2019 |
| KR | 1020140118456 | 10/2014 |

OTHER PUBLICATIONS

KR Office Action in Korean Appln. No. 10-2020-0032203, dated May 4, 2021, 10 pages (with English translation).

Notice of Allowance in Chinese Appln. No. 202011374401.5, dated May 24, 2023, 16 pages (with English translation).

\* cited by examiner

MOTOR HAVING AN IMPELLER AND A PRINTED CIRCUIT BOARD

CROSS-REFERENCE TO RELATED APPLICATION

Pursuant to 35 U.S.C. § 119(a), this application claims the benefit of the earlier filing date and the right of priority to Korean Patent Application No. 10-2020-0032203, filed on Mar. 16, 2020, the contents of which is incorporated by reference herein in its entirety.

TECHNICAL FIELD

The present disclosure relates to a motor, and more particularly, a motor having a structure to reduce a flow resistance.

BACKGROUND

A motor is an apparatus that converts electrical energy into mechanical energy. A conventional motor can include an impeller rotated by converted mechanical energy to create a flow of fluid.

Such conventional motor can further include a flow path through which fluid flowing by the impeller passes. In some examples, in order to increase an amount of fluid or a flow rate of fluid, it is preferable to reduce a flow resistance of the flow path.

When there is a protrusion on the flow path, fluid can collide with the protrusion to increase a flow resistance of the flow path.

In some examples, when there is a recessed portion on the flow path, fluid can spin in the recessed portion to increase a flow resistance of the flow path.

In particular, in a device such as a hair dryer, a size of a motor is also reduced due to a size of the device. Accordingly, a printed circuit board (PCB) provided to control the motor is disposed adjacent to a power portion of the motor. The control includes an operation control by a control signal or a power control by an electrical connection.

As a result, the printed circuit board can protrude to a flow path formed inside the motor. Accordingly, fluid can collide with the printed circuit board to increase a flow resistance of the flow path.

A conventional motor having an impeller rotated by electrical energy can have a structure in which fluid suctioned by the impeller flows through a flow path formed in a housing.

However, the conventional motor does not disclose a separate printed circuit board (PCB) for controlling the impeller of the motor.

That is, the conventional has a limitation that flow resistance of the flow path is increased by the printed circuit board (PCB).

SUMMARY

The present disclosure is directed to a motor.

According to one aspect of the subject matter described in this application, a motor includes an inner housing defining an accommodation space, an outer housing defining a flow path with the inner housing, an impeller disposed at a first side of the inner housing, a power portion that is disposed in the accommodation space and that includes a rotation shaft coupled to the impeller so as to be rotated together with the impeller, a bracket coupled to the inner housing at a second side of the inner housing and rotatably supporting the rotation shaft, and a printed circuit board (PCB) that is spaced apart from the bracket by a predetermined distance and that is electrically connected to the power portion. A circumference of the PCB includes a plurality of concave portions that are spaced apart from each other, and the plurality of concave portions are recessed toward a center of the PCB.

Implementations according to this aspect can include one or more of the following features. For example, the PCB can include a plurality of protrusions that protrude radially outward and that define a predetermined angle with each other.

In some examples, each of the plurality of concave portions can be provided between the plurality of protrusions that are adjacent to each other in a circumferential direction. In some implementations, the plurality of concave portions can curve toward the center of the PCB.

In some implementations, a portion of the plurality of concave portions that is closest to the center of the PCB can be angled. In some examples, each end portion of the plurality of protrusions can include a plurality of connection pins extending toward the power portion, and the plurality of connection pins can be electrically coupled to the power portion.

In some examples, the bracket can include a bracket body portion configured to accommodate the rotation shaft to rotatably support the rotation shaft and a plurality of bracket coupling portions protruding from an outer circumferential surface of the bracket body portion and extending toward the inner housing. The plurality of connection pins can extend toward the power portion between the bracket coupling portions adjacent to each other among the plurality of bracket coupling portions.

In some examples, the power portion can include a stator core that is spaced apart from the rotation shaft by a predetermined distance to surround the rotation shaft and that is coupled to the inner housing, a stator coil wound around the stator core, and an insulator coupled to the stator core between the stator core and the stator coil. A plurality of connection pin coupling portions can be provided to protrude from an outer circumferential surface of a portion of the insulator facing the PCB, and the plurality of connection pins can be inserted into the plurality of connection pin coupling portions to be electrically connected to the stator coil.

In some examples, the bracket can include a bracket body portion configured to accommodate the rotation shaft to rotatably support the rotation shaft and a plurality of bracket coupling portions protruding from an outer circumferential surface of the bracket body portion and extending toward the inner housing. In some implementations, the plurality of bracket coupling portions can overlap the plurality of protrusions in an axial direction.

According to another aspect of the subject matter described in this application, a motor includes an inner housing defining an accommodation space, an outer housing defining a flow path with the inner housing, an impeller provided at a first side of the inner housing, a power portion that is disposed in the accommodation space and that includes a rotation shaft coupled to the impeller so as to be rotated together with the impeller, a bracket coupled to the inner housing at a second side of the inner housing and rotatably supporting the rotation shaft, and a printed circuit board (PCB) that is spaced apart from the bracket by a predetermined distance and that is electrically connected to the power portion. The PCB can include a plurality of protrusions that protrude radially outward and that have a predetermined angle with each other, and the bracket can include a bracket body portion configured to accommodate the rotation shaft to rotatably support the rotation shaft and a plurality of bracket coupling portions protruding from an outer circumferential surface of the bracket body portion and extending toward the inner housing. The plurality of bracket coupling portions can overlap the plurality of protrusions in an axial direction.

Implementations according to this aspect may include one or more of the following features. For example, each of a plurality of concave portions can be provided between the plurality of protrusions that are adjacent to each other in a circumferential direction.

In some examples, the plurality of concave portions can be recessed toward a center of the PCB. In some examples, a circumferential surface of each of the plurality of protrusions that surround the plurality of concave portions can be curved toward a center of the PCB.

In some implementations, a portion of the plurality of concave portions that is closest to a center of the PCB can be angled. In some implementations, the plurality of bracket coupling portions can be coupled to (i) the second side of the inner housing or (ii) the power portion.

In some examples, each end portion of the plurality of protrusions can include a plurality of connection pins extending toward the power portion. In some examples, the plurality of connection pins can pass through the plurality of bracket coupling portions to be electrically connected to the power portion.

In some implementations, the bracket body portion can have a cylindrical shape. In some implementations, the plurality of bracket coupling portions can be spaced apart from each other.

DETAILED DESCRIPTION

Figure 1:
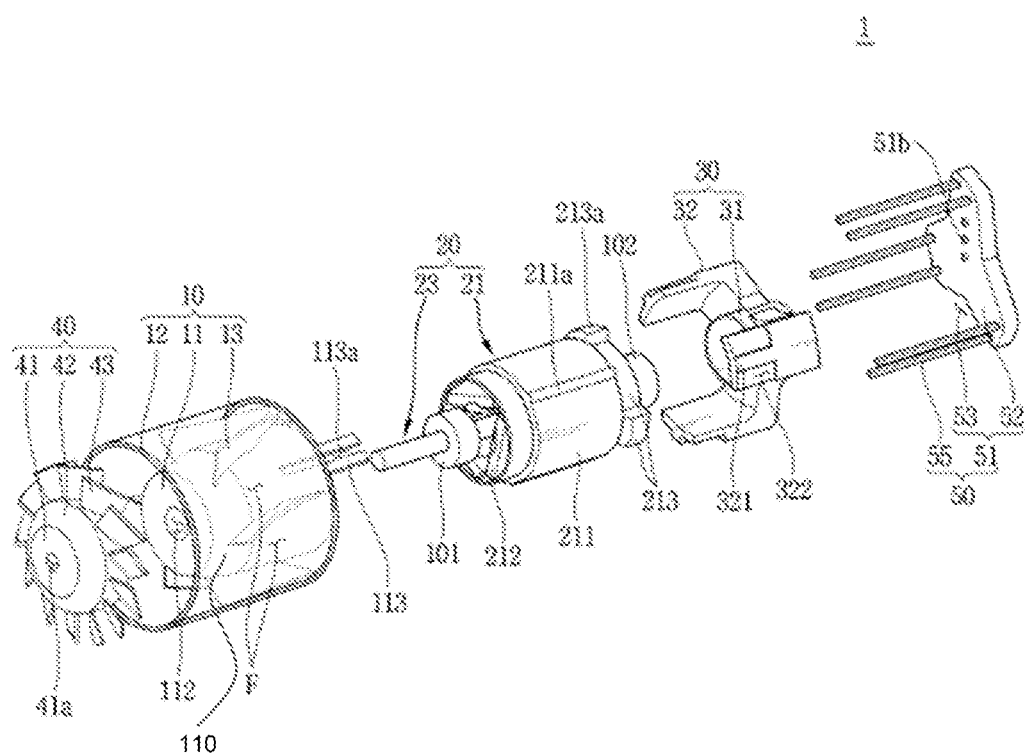
FIG. 1 is a diagram illustrating an exploded perspective view of an exemplary motor.
Figure 2:
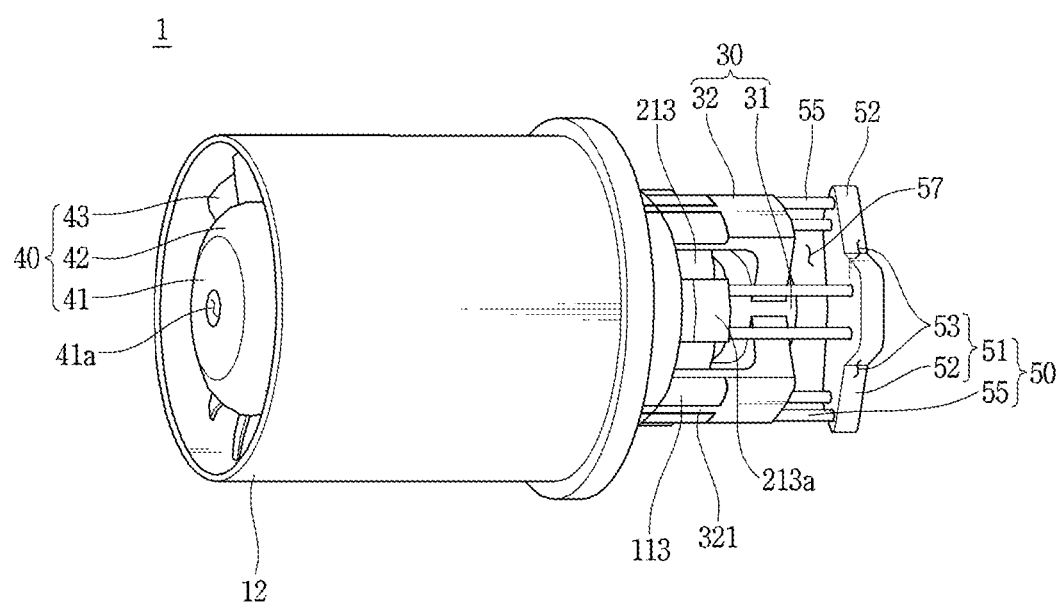
FIG. 2 is a diagram illustrating a perspective view of the exemplary motor of FIG. 1.

Referring to FIGS. 1 to 4, a motor 1 includes a housing 10, a power portion 20, a bracket 30, an impeller 40, and a controller 50.

The housing 10 can accommodate the power portion 20 therein.

The housing 10 can include an inner housing 11, an outer housing 12, and a vane 13.

A predetermined accommodation space 110 can be defined inside the inner housing 11, and the power portion 20 can be accommodated in the accommodation space 110.

The inner housing 11 can extend forwardly and rearwardly, and the inner housing 11 can be provided in a cylindrical shape with both sides thereof being opened in an extending direction.

A central portion of a front side of the inner housing 11 is provided with a bearing portion 112 provided therethrough, and a rear side of the inner housing 11 is opened. A first bearing accommodating portion 111 having a radius larger than that of the bearing portion 112 is provided at a rear side of the bearing portion 112.

The outer housing 12 surrounds the inner housing 11 from an outer side of the inner housing 11. In some implementations, the outer housing 12 can have a radius larger than that of the inner housing 11 and can have a cylindrical shape with both sides thereof being opened in the extending direction.

In some implementations, from a rear end of the inner housing 11, coupling protrusions 113 can protrude rearwardly. In some implementations, the coupling protrusion 113 can be provided in plurality and the plurality of coupling protrusions can be spaced apart from each other.

In some implementations, coupling guide grooves 113a into which core protrusions 211a of a stator core 211 are inserted can be provided at a portion of the inner housing 11 and at a portion of the coupling protrusions 113.

The coupling guide grooves 113a can extend from a rear side to a front side of each of the coupling protrusions 113. For example, the coupling guide grooves 113a can extend to an intermediate portion of the inner housing 11 in a direction in which the inner housing 11 extends.

Since the core protrusions 211a are inserted into the coupling guide grooves 113a when the stator core 211 and the inner housing 11 are coupled, coupling between the stator core 211 and the inner housing 11 can be made robust.

After the core protrusions 211a are inserted into the coupling guide grooves 113a, bracket coupling protrusions 321 can be inserted into the coupling guide grooves 113a. Accordingly, the bracket 30 and the inner housing 11 can be coupled.

Between the outer housing 12 and the inner housing 11, an annular space can be defined. The annular space can be partitioned into a plurality of spaces by the vane 13 that connects the inner housing 11 and the outer housing 12.

Each of partitioned spaces can be provided with a flow path F through which fluid suctioned by the impeller 40 passes. For example, a space surrounded by the inner housing 11, the outer housing 12, and the vane 13 can be provided as a flow path F through which fluid flows.

A front side can be defined as upstream of the flow path, and a rear side can be defined as downstream of the flow path.

The vane 13 can extend from an outer circumferential surface of the inner housing 11 to an inner circumferential surface of the outer housing 12. In some implementations, the vane 13 can have a spiral shape in a circumferential direction of the inner housing 11.

When external fluid is suctioned by the impeller 40, the suctioned fluid flows through the flow path F provided by the outer circumferential surface of the inner housing 11, the inner circumferential surface of the outer housing 12 and the vane 13. For example, fluid suctioned by the impeller 40 can flow from the front side to the rear side through the flow path F.

The impeller 40 can be rotated by the power portion 20 accommodated in the accommodation space 110 of the inner housing 11.

The power portion 20 can include a stator 21 and a rotor 23. When external power is supplied to the stator 21, the rotor 23 can be rotated with respect to the stator 21.

The stator 21 can include the stator core 211 and a stator coil 212 that wound around the stator core 211.

In some implementations, the stator core 211 can be provided by stacking a plurality of steel sheets in a front-rear direction in an insulated manner. The steel sheets can include a plurality of annular yoke portions and teeth portions protruding radially inward from the annular yoke portions. In the teeth portion, the teeth can disposed to be spaced apart from each other.

Between the teeth adjacent to each other, a predetermined slot is provided. For example, the teeth and the slots are alternately disposed in a circumferential direction of the yoke portion.

As the plurality of steel sheets are stacked in the front-rear direction to provide the stator core 211, the yoke portions, the teeth portions, and the slots can also be stacked to be extended in the front-rear direction.

An insulator 213 can be provided at a front end, a rear end, and the slots of the stator core 211.

The stator coil 212 can be wound around the teeth portion in a predetermined pattern. For example, the stator coil 212 can pass through the slots at both sides of the tooth to be wound around the teeth portion. Since the stator coil 212 is wound around the insulator 213, insulation resistance between the stator coil 212 and the stator core 211 can be increased.

The wound stator coil 212 can be electrically connected to the controller 50 to receive power from an external power source. When power is supplied to the stator coil 212, a magnetic field passing through the stator core 211 can be provided around the stator coil 212.

In some implementations, an outer circumferential surface of the stator core 211 can be press-fitted into an inner circumferential surface of the inner housing 11. Accordingly, the stator 21 can be coupled to the inner housing 11 to be accommodated in the accommodation space 110.

A rotor core 232 can be disposed to be rotatable with respect to the stator core 211 at a radially inner side of the stator core 211. For example, the rotor core 232 can be disposed to be rotatable with respect to the stator core 211 at a radially inner side of the teeth portions of the stator core 211.

The rotor core 232 can be provided by stacking a plurality of steel plates in the front-rear direction. The steel plate can be provided in an annular shape. In some implementations, the rotor core 232 can include a permanent magnet providing a magnetic field. The rotor core 232 can be rotated by an interaction between a magnetic field provided by the stator coil 212 and a magnetic field provided by the permanent magnet.

The rotor core 232 can be coupled to a rotation shaft 231. Specifically, the rotation shaft 231 passes through a central portion of the rotor core 232 to protrude outward of both sides of the rotor core 232. In some implementations, an outer circumferential surface of the rotation shaft 231 can be press-fitted into an inner circumferential surface of the rotor core 232, whereby the rotation shaft 231 and the rotor core 232 are coupled to each other.

The coupled rotation shaft 231 rotates together with the rotor core 232.

Of both sides of the rotation shaft 231, one side of the rotation shaft 231 protruding frontwardly passes through the bearing portion 112 of the inner housing 11 to protrude outward of the front side of the inner housing 11.

A first bearing 101 can be provided in the first bearing accommodating portion 111 formed at the rear side of the bearing portion 112. The first bearing 101 supports the rotation shaft 231 to be rotatable in an axial direction and a radial direction.

In addition, the one side of the rotation shaft 231 protruding outward of the front side of the inner housing 11 is coupled to the impeller 40.

In addition, of the both sides of the rotation shaft 231, another side of the rotation shaft 231 protruding rearwardly passes through an open rear side of the inner housing 11 to protrude outward of the rear side of the inner housing 11.

The another side of the rotation shaft 231 protruding outward of the rear side of the inner housing 11 is rotatably accommodated in a second bearing accommodating portion 311 of the bracket 30.

A second bearing 102 can be provided in the second bearing accommodating portion 311. The second bearing 102 can support the rotation shaft 231 to be rotatable in the axial direction and the radial direction.

For example, the one side of the rotation shaft 231 can be rotatably supported by the first bearing 101 provided in the inner housing 11, and the another side of the rotation shaft 231 can be rotatably supported by the second bearing 102 provided in the bracket 30.

The bracket 30 can include a bracket body portion 31 and bracket coupling portions 32.

In some implementations, the bracket body portion 31 can have a cylindrical shape with both sides thereof being opened. The second bearing accommodating portion 311 accommodating an end portion of the rotation shaft 231 can be recessed at a front side of the bracket body portion 31. A bracket penetrating portion 312 having a diameter smaller than that of the second bearing accommodating portion 311 can be provided through a rear side of the second bearing accommodating portion 311.

The bracket coupling portions 32 each can extend from an outer circumferential surface of the bracket body portion 31. The bracket coupling portion 32 can be provided in plurality to be spaced apart from each other.

In some implementations, the bracket coupling portions 32 can extend radially outward from the outer circumferential surface of the bracket body portion 31 by a predetermined length and then can extend toward the inner housing 11 by a predetermined length. Each end portion of the bracket coupling portions 32 that is adjacent to the coupling protrusions 113 of the inner housing 11 can be coupled to an inner circumferential surface of each of the coupling protrusions 113.

An outer surface of each end portion of the bracket coupling portions 32 can be engaged with each of the coupling protrusions 113.

In some implementations, each of the bracket coupling protrusions 321 can be provided at an outer side of each end portion of the bracket coupling portions 32, and bracket coupling grooves 322 can be provided at both sides of the bracket coupling protrusion 321.

The bracket coupling protrusions 321 can be inserted into the coupling guide grooves 113a, and the coupling protrusions 113 can be inserted into the bracket coupling grooves 322. Thereby, the bracket coupling portions 32 and the inner housing 11 can be coupled to each other.

In some implementations, in order to firmly couple the bracket coupling portions 32 and the coupling protrusions 113, an adhesive material can be applied to the inner circumferential surface of each of the coupling protrusions 113.

A rear end portion of the rotation shaft 231 can be accommodated in the second bearing accommodating portion 311 of the bracket 30, and a front end portion of the rotation shaft 231 can be coupled to the impeller 40.

The impeller 40 can include a shaft coupling hub 41, a rotation body 42, and a rotation blade 43.

The shaft coupling hub 41 can be coupled to the rotation shaft 231 to be rotated together with the rotation shaft 231. In some implementations, the shaft coupling hub 41 can be made of a material similar to that of the rotation shaft 231. For example, the shaft coupling hub 41 can be made of a metal material.

In some implementations, the shaft coupling hub 41 can extend in the axial direction. The shaft coupling hub 41 can have a pillar shape in which a radius of an intermediate portion thereof is smaller than radii of both sides thereof in the extending direction.

A shaft coupling hole 41a can be provided through the shaft coupling hub 41 in a first direction. The first direction can be defined as a direction in which the rotation shaft 231 extends. As depicted in FIG. 1, the first direction can be defined as the front-rear direction.

The rotation shaft 231 can be inserted into the shaft coupling hole 41a. Accordingly, when the rotation shaft 231 rotates, the impeller 40 can rotate together with the rotation shaft 231. In some implementations, the outer circumferential surface of the rotation shaft 231 can be press-fitted into an inner circumferential surface of the shaft coupling hole 41a, whereby the rotation shaft 231 and the shaft coupling hub 41 can be firmly coupled.

The rotation body 42 can be coupled to the shaft coupling hub 41 while surrounding an outer circumferential surface of the shaft coupling hub 41. In some implementations, the rotation body 42 can be coupled to the shaft coupling hub 41 by an injection molding method. For example, the rotation body 42 can be coupled to the shaft coupling hub 41 by being brought into contact with the outer circumferential surface of the shaft coupling hub 41.

In some implementations, the rotation body 42 can have a cylindrical shape surrounding the outer circumferential surface of the shaft coupling hub 41.

The rotation blade 43 that suctions external fluid when the rotation body 42 rotates can be provided to protrude from an outer circumferential surface of the rotation body 42. The rotation blade 43 can be provided in plurality in a circumferential direction of the rotation body 42. The plurality of the rotation blades 43 can be spaced apart from each other.

In some implementations, the rotation body 42 and the rotation blade 43 can be made of a material having a density smaller than that of the shaft coupling hub 41. For example, the rotation body 42 and the rotation blade 43 can be made of a material having a flexibility higher than that of the shaft coupling hub 41. By way of further example, the rotation body 42 and the rotation blade 43 can be made of a non-metallic material.

A rotation of the impeller 40 can be controlled by the controller 50 located at a rear side of the bracket 30.

Figure 3:
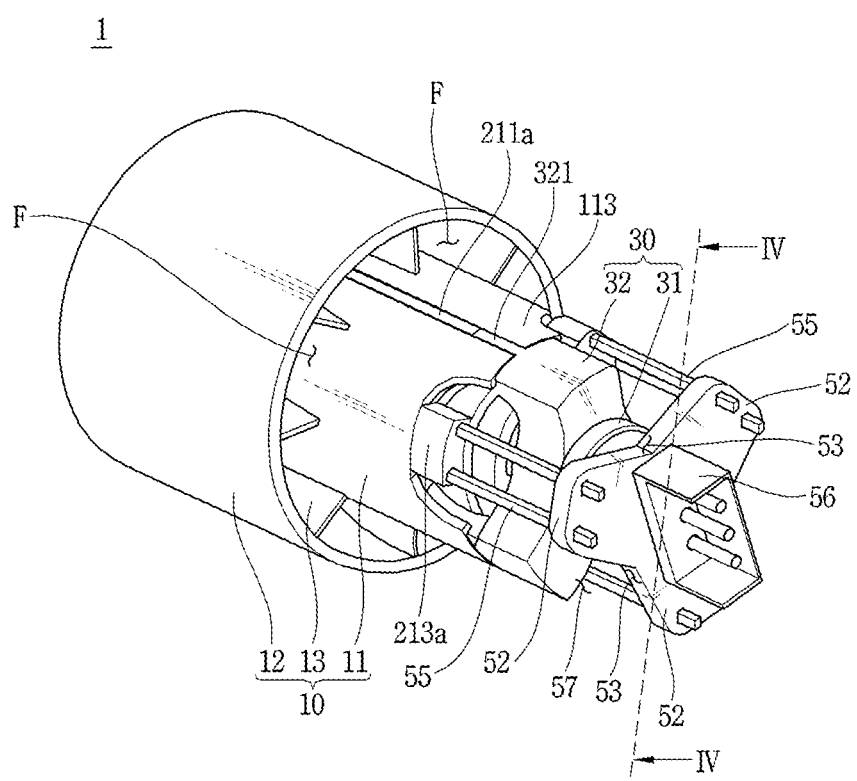
FIG. 3 is a diagram illustrating a perspective view of the exemplary motor of FIG. 2.

Hereinafter, the controller 50 included in the motor 1 will be described with reference to FIGS. 3 and 5.

The controller 50 can include a printed circuit board (PCB) 51, connection pins 55, and a power input unit 56.

The printed circuit board (PCB) 51 can have a plate shape, and can control an operation of the power portion 20. In some implementations, the printed circuit board 51 can include electronic components to control the power portion 20 and electronic circuits to electrically connect between each of the components. The control can include an operation control by a control signal or a power control by an electrical connection.

The printed circuit board 51 can be rearwardly spaced apart from the bracket 30 by a predetermined distance.

Accordingly, a predetermined spacing 57 can be provided between the printed circuit board 51 and the bracket 30.

A portion of fluid moved downstream through the bracket 30 can collide with the printed circuit board 51. Thus, the fluid can lose energy by the collision.

For example, a portion of the fluid moved toward the spacing 57 can lose its energy by colliding with the printed circuit board 51.

In order to reduce an amount of energy that can be lost due to collision with the printed circuit board 51, a plurality of concave portions 53 can be provided around the printed circuit board 51 with being spaced apart from each other.

In some implementations, the plurality of concave portions 53 can be recessed from an outer circumferential surface of the printed circuit board 51 toward a center of the printed circuit board 51.

Since the concave portions 53 are recessed from the outer circumferential surface of the printed circuit board 51 toward the center, fluid can pass through the concave portions 53 without colliding with the printed circuit board 51 to move downstream.

Accordingly, an amount of energy loss of the fluid due to the collision with the printed circuit board 51 can be reduced. For example, due to the concave portions 53, a flow resistance by the printed circuit board 51 can be reduced.

Accordingly, an amount of fluid moving downstream per unit time can be increased.

As a result, a flow rate of the fluid flowing rearward of the printed circuit board 51 by the impeller 40 can be increased.

The printed circuit board 51 can be provided with a plurality of protrusions 52 protruding radially outward while having a predetermined angle with each other. Each of the concave portions 53 can be provided between protrusions 52 adjacent to each other in a circumferential direction.

In some implementations, the printed circuit board 51 can be provided with three protrusions 52 forming with each other a predetermined angle and protruding in three directions. In some implementations, angles formed between each of the three protrusions 52 can be equal.

Both side surfaces of the protrusions 52 extending in each direction from the center of the printed circuit board 51 can be provided in straight lines. Since each of the concave portions 53 is surrounded by side surfaces of the protrusions 52 that are adjacent to each other, a shape formed by the side surfaces surrounding each of the concave portions 53 can have a V-shape. A portion of the plurality of concave portions 53 closest to the center of the printed circuit board 51 can bend.

An outer side in a radial direction of each of the protrusions 52 can be provided with connection pin coupling holes 51a formed therethrough in an axial direction.

Into the connection pin coupling holes 51a, the connection pins 55 to electrically connect between the printed circuit board 51 and the power portion 20 can be coupled.

The connection pin 55 can extend by a predetermined length in the axial direction. A first end portion of the connection pin 55 can be inserted into the connection pin coupling hole 51a, and a second end portion of the connection pin 55 can be electrically coupled to the power portion 20.

Accordingly, the printed circuit board 51 and the power portion 20 can be electrically connected. In some implementations, the second end portion can be defined as a front end portion and the first end portion can be defined as a rear end portion.

The insulator 213 can be provided with connection pin coupling portions 213a. The power portion 20 and the connection pins 55 can be electrically connected to each other in the connection pin coupling portions 213a.

A portion of the insulator 213 protruding rearward of the stator core 211 can have a cylindrical shape with a central portion thereof being penetrated. On an outer circumferential surface of the insulator 213, the connection pin coupling portions 213a can protrude outwardly in the radial direction.

The connection pin coupling portions 213a can be provided in a number corresponding to a number of the protrusions 52 of the printed circuit board 51, and the plurality of connection pin coupling portions 213a can be spaced apart from each other in a circumferential direction of the insulator 213.

The second end portion of the connection pin 55 can be inserted into the connection pin coupling portion 213a.

The second end portion of the connection pin 55 inserted into the connection pin coupling portion 213a can be electrically connected to the stator coil 212. Accordingly, the electronic circuits of the printed circuit board 51 and the stator coil 212 can be electrically connected.

Power input unit coupling holes 51b connected to the electronic circuits can be provided through a central portion of the printed circuit board 51.

The power input unit 56 can be inserted into the power input unit coupling holes 51b at a rear surface of the printed circuit board 51, and an external power source can be electrically coupled to the power input unit 56.

Accordingly, power input from the external power source can be applied to the stator coil 212 through the power input unit 56, the electronic circuit, and the connection pins 55.

When power is applied to the stator coil 212, a magnetic field can be provided around the stator coil 212, and the rotor 23 can be rotated with respect to the stator 21 by an interaction between the magnetic field of the stator coil 212 and a magnetic field of the rotor 23.

As described above, when power is applied from an external power source to the stator coil 212, a magnetic field can be provided around the stator coil 212.

The magnetic field provided by the stator coil 212 can interact with a magnetic field provided by a permanent magnet of the rotor 23 to rotate the rotor 23 with respect to the stator 21.

When the rotor 23 rotates, the impeller 40 coupled with the rotation shaft 231 of the rotor 23 can rotate together.

When the impeller 40 rotates, fluid can flow by the rotation blade 43. The fluid can be suctioned from the front side, and can pass through the flow path F of the housing 10 to flow rearwardly.

Here, fluid passing through a portion where the concave portions 53 are provided can be smoothly moved downstream without colliding with the printed circuit board 51.

Accordingly, a flow resistance due to the printed circuit board 51 in a path through which fluid moves can be reduced.

Accordingly, an amount of fluid moving downstream per unit time can be increased.

As a result, a flow rate of the fluid flowing rearward of the printed circuit board 51 by the impeller 40 can be increased.

Figure 4:
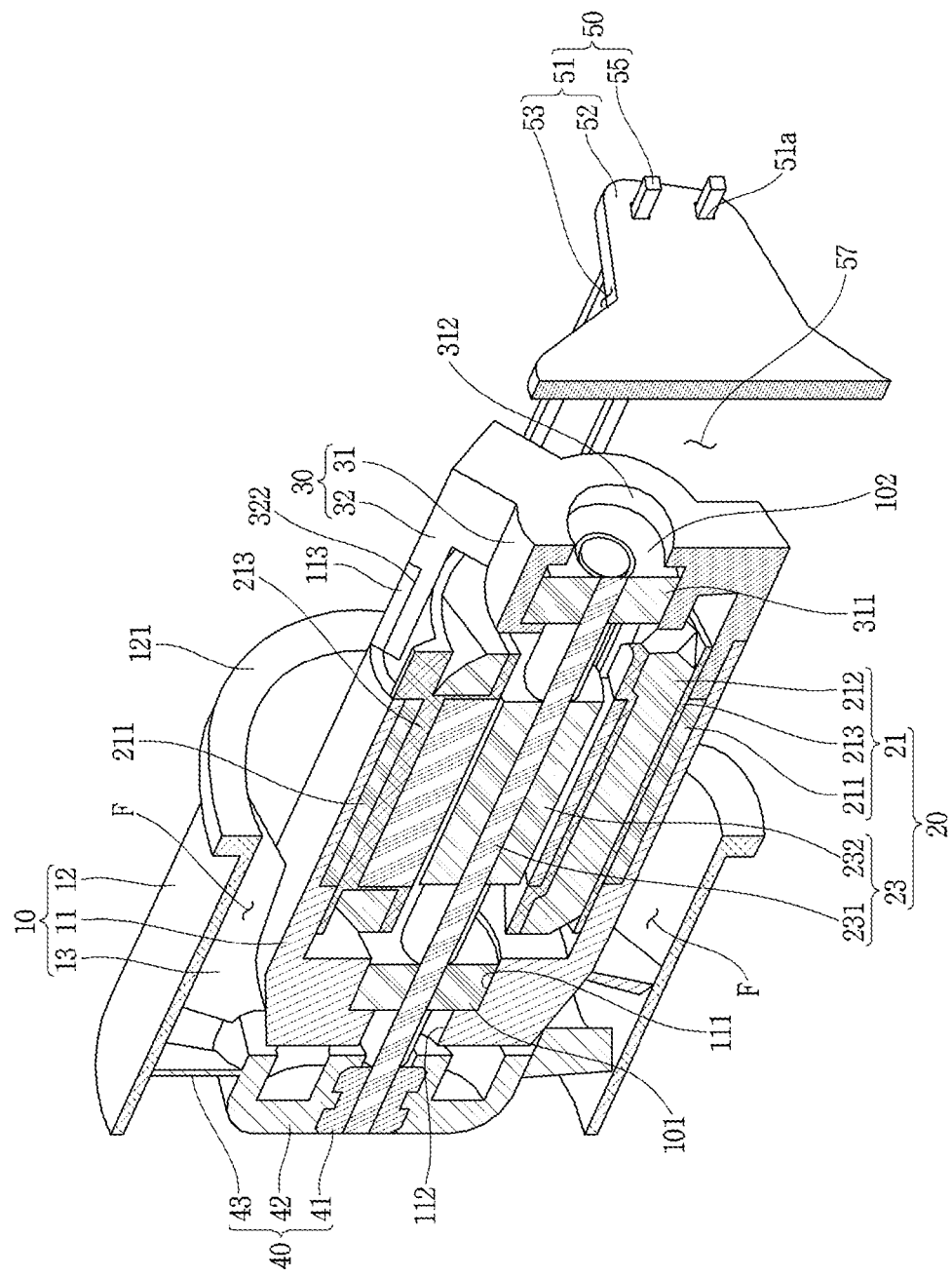
FIG. 4 is a diagram illustrating a sectional view of the exemplary motor of FIG. 3 taken along line IV-IV.
Figure 6:
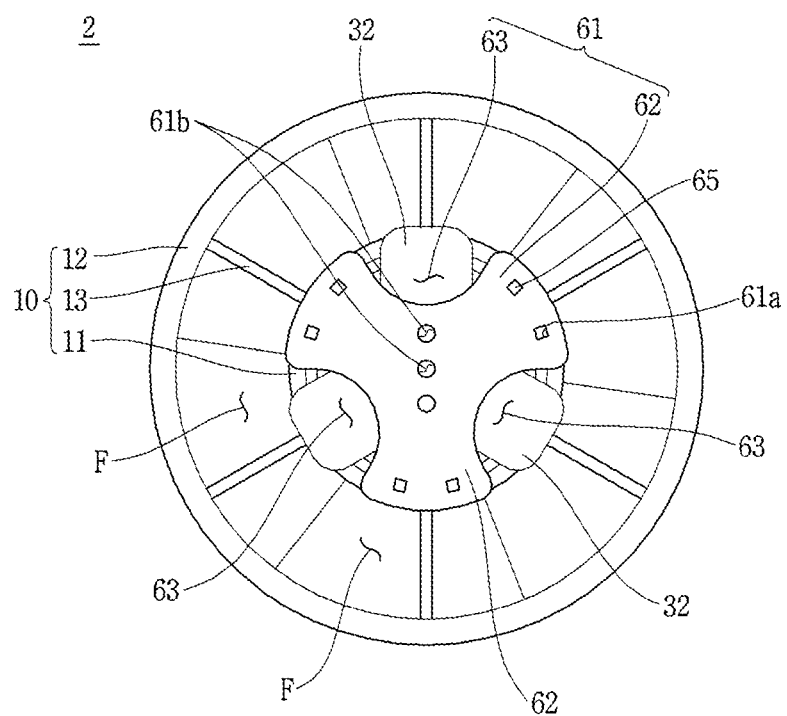
FIG. 6 is a diagram illustrating a bottom view of an exemplary motor.

Hereinafter, a motor 2 will be described with reference to FIGS. 4 and 6.

Compared with the motor 1 of the above-described implementation, the motor 2 has the following differences.

A printed circuit board 61 included in the motor 2 can be provided with concave portions 63 provided to be curved toward a center of the printed circuit board 61.

In some implementations, the concave portions 63 can be recessed at an outer circumference of the printed circuit board 61 toward the center of the printed circuit board 61. Each surface of protrusions 62 surrounding the concave portions 63 can be curved toward the center of the printed circuit board 61.

For example, the concave portion 63 can have a curved boundary.

A description of an effect of the concave portion 63 is described above, and will not be repeated.

However, since the boundary of the concave portion 63 is curved toward the center of the printed circuit board 61 rather than being bent, the concave portion 63 of the motor 2 can have an area larger than the concave portion 53 of the motor 1.

Accordingly, a flow rate of fluid that does not collide with the printed circuit board 61 can be increased.

Then, a larger amount of fluid, compared with the concave portion 53 of the motor 1, can be moved to the rear side without colliding with the printed circuit board 61.

Accordingly, a flow efficiency of the fluid flowing by the impeller 40 can be increased compared with the concave portion 53 of the motor 1.

As a result, a volume per unit time of the fluid flowing toward the rear side of the printed circuit board 61 by the impeller 40 can be increased compared with the V-shaped concave portion.

As a result, a volume of the fluid flowing to the rear side of the printed circuit board 61 by the impeller 40 can be increased compared with the V-shaped concave portion.

Except for the above differences, as the motor 2 can be similar in the configuration and the effect to the motor 1, the configuration of the motor 2 without description can be understood with reference to the description of the motor 1.

Figure 7:
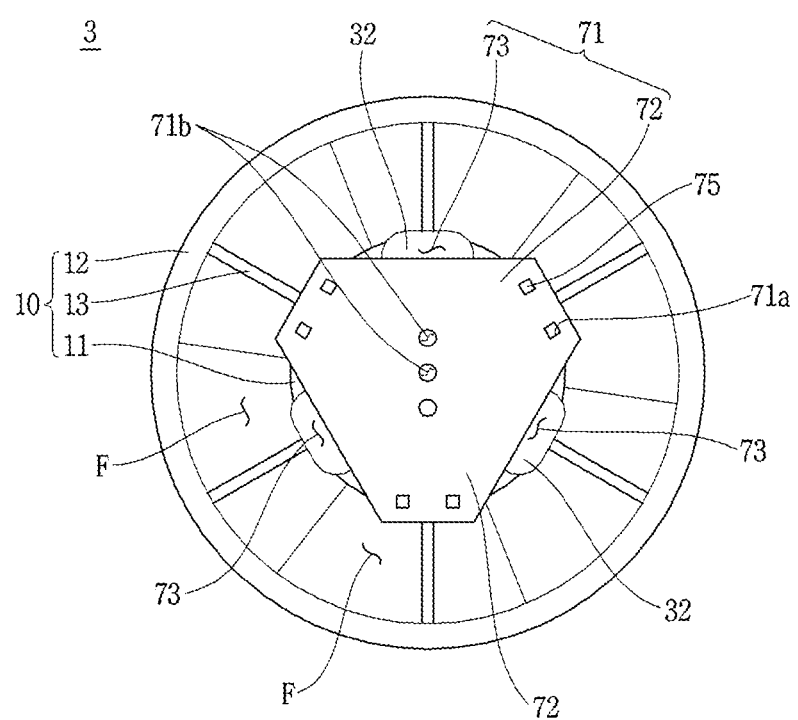
FIG. 7 is a diagram illustrating a bottom view of an exemplary motor.

Hereinafter, a motor 3 will be described with reference to FIGS. 4 and 7.

Compared with the motor 1 of the above-described implementation, the motor 3 can have the following differences.

A printed circuit board 71 included in the motor 3 can have a shape in which three vertices of a triangle are all cut out, and radially outer side portions of edges of the triangle can be defined as concave portions 73.

A description of an effect of the concave portion 73 is described above, and will not be repeated.

However, since the printed circuit board 71 has a shape in which three vertices of a triangle are all cut out, a manufacturing process of the printed circuit board 71 can be simpler than that of the printed circuit board 61.

In some implementations, a distance between an edge, which is a boundary of the concave portion 73, and a center of the printed circuit board 71 is increased. For example, a cross-sectional area of the printed circuit board 71 in a radial direction is increased.

Accordingly, a creation of a weak portion, which is a portion whose width is significantly smaller than other portions of the printed circuit board 71, can be suppressed.

As a result, a decrease in a strength of the printed circuit board 71 due to the concave portions 73 can be suppressed.

Except for the above differences, as the motor 3 can be similar in the configuration and the effect to the motor 1, the configuration of the motor 3 without description can be understood with reference to the description of the motor 1.

Figure 8:
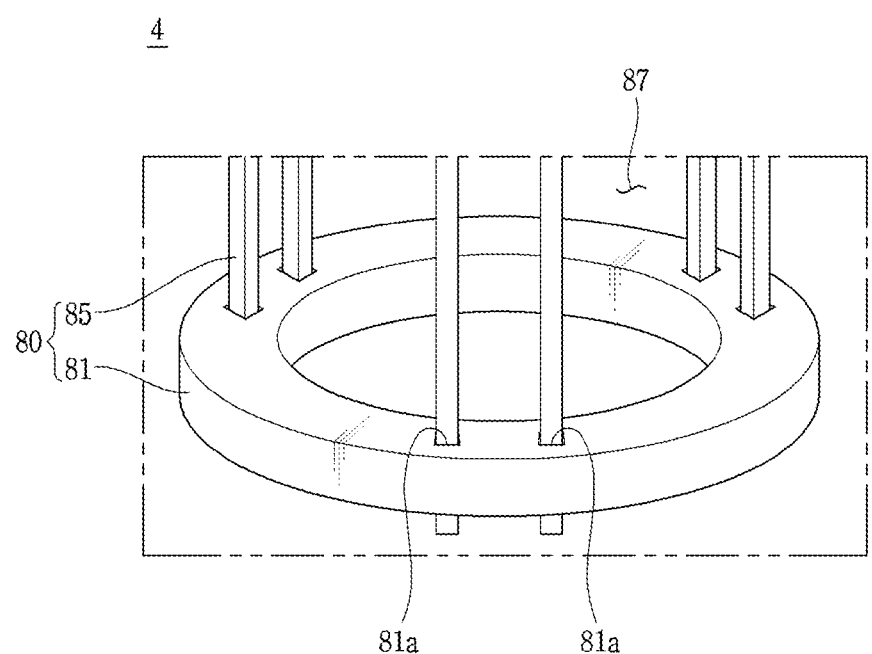
FIG. 8 is a diagram illustrating a perspective view of a printed circuit board of an exemplary motor.

Hereinafter, a motor 4 will be described with reference to FIGS. 4 and 8.

Compared with the motor 1 of the above-described implementation, the motor 4 can have the following differences.

A printed circuit board 81 included in the motor 4 can have an annular plate shape. In some implementations, the printed circuit board 81 can have a donut shape having an outer circumference and an inner circumference. For example, a central portion of the printed circuit board 81 can be penetrated.

Accordingly, the bracket 30 can be at least partially inserted into the central portion of the printed circuit board 81. Accordingly, when the bracket 30 is made of an insulating material, a space insulation distance can be reduced. As a result, a size of a total space occupied by the motor 4 can be reduced.

In some implementations, the printed circuit board 81 can be disposed adjacent to the rear side of the bracket 30 without a spacing 87. For example, a distance between the bracket 30 and the printed circuit board 81 can further be reduced.

As a result, a length of the motor 4 in the axial direction can be reduced and thus miniaturized.

Except for the above differences, as the motor 4 can be similar in the configuration and the effect to the motor 1, the configuration of the motor 4 without description can be understood with reference to the description of the motor 1.

A motor 5 will be described with reference to FIGS. 4, 9, and 10.

Figure 9:
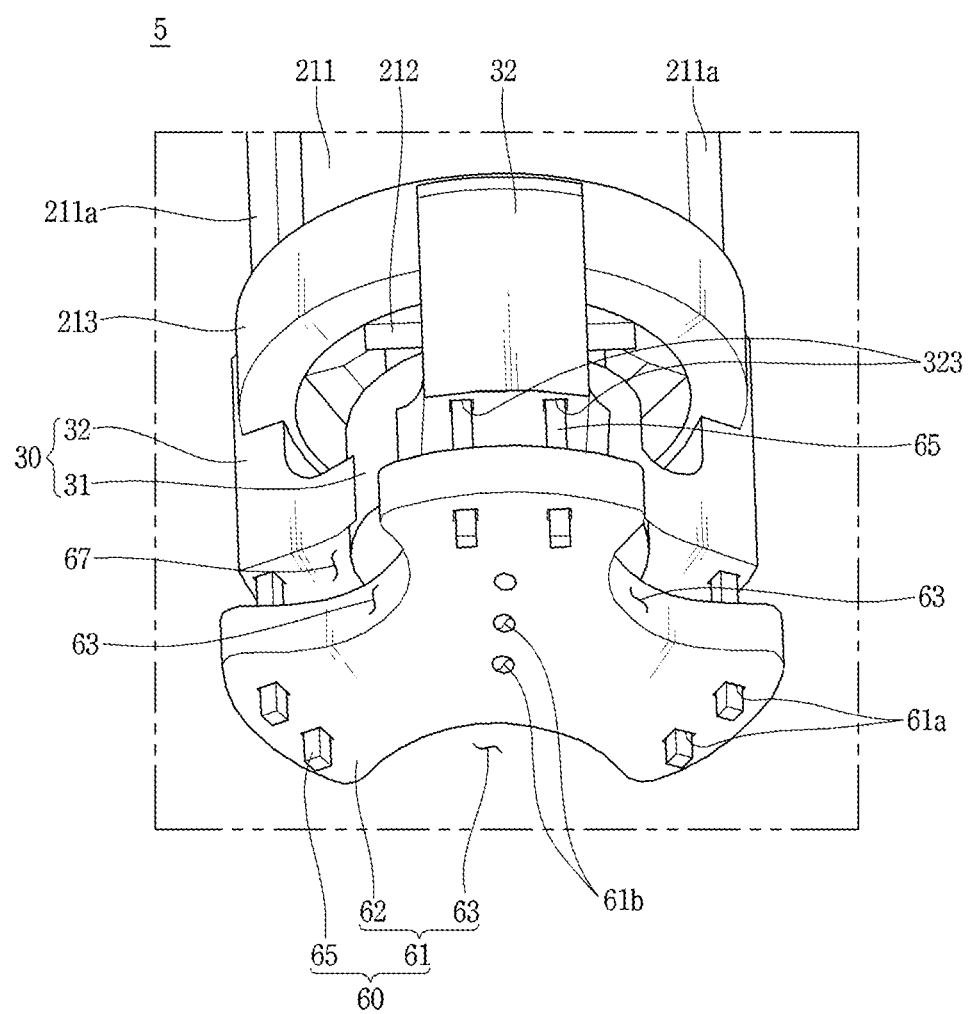
FIG. 9 is a diagram illustrating a perspective view of an exemplary motor.
Figure 10:
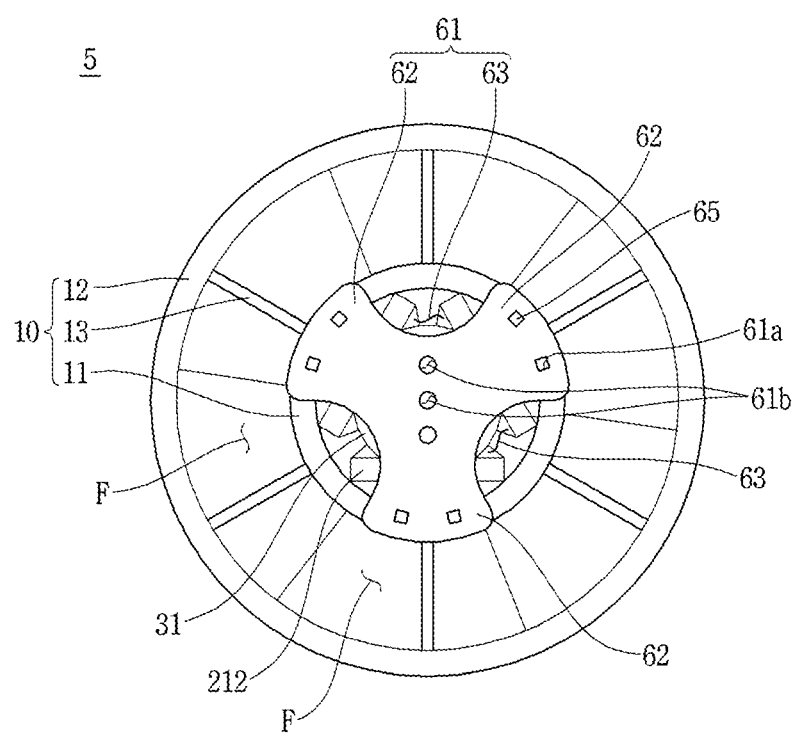
FIG. 10 is a diagram illustrating a bottom view of the exemplary motor of FIG. 9.

In FIGS. 9 and 10, an illustration of the inner housing 11 is omitted for convenience of understanding.

Compared with the motor 1 of the above-described implementation, the motor 5 can have the following differences.

As the connection pins 55 extend toward the insulator 213 through spaces between bracket coupling portions 32 adjacent to each other in the motor 1, the connection pin coupling portions 213a for accommodating the connection pins 55 can protrude radially outward from the insulator 213.

Further, with respect to the motor 5, since connection pins 65 pass through the bracket coupling portions 32 to be inserted into the insulator 213, a separate connection pin coupling portion 213a is not provided.

In addition, the bracket coupling portions 32 provided in the motor 1 can be coupled to the coupling protrusions 113 extending from the inner housing 11.

Further, the bracket 30 provided in the motor 5 can be coupled to the outer circumferential surface of the insulator 213 rather than being coupled to the inner housing 11.

The insulator 213 provided in the motor 5 does not have the connection pin coupling portions 213a protruding in the radial direction, and the insulator 213 can be located radially inward compared with the inner housing 11.

Accordingly, in a radial direction of the bracket 30, a longest distance from a center of the bracket 30 can be reduced. For example, a size of the bracket 30 in the radial direction can be reduced.

By way of further example, the bracket 30 provided in the motor 1 can be coupled to the inner circumferential surface of the inner housing 11. The inner circumference of the inner housing 11 of the motor 5 can be generally longer than an outer circumference of the insulator 213.

Accordingly, as the bracket 30 is coupled to the outer circumferential surface of the insulator 213, a maximum radius of the bracket 30 can be reduced.

Accordingly, a size of a portion of the bracket 30 that overlaps the flow path F in the axial direction can be reduced.

As a result, a frequency of fluid moving downstream through the flow path F to collide with the bracket 30 can be reduced.

As a result, a loss of kinetic energy of fluid due to collision with the bracket 30 after passing through the flow path F to move downstream can be suppressed.

As a result, a flow resistance on a path through which fluid moves by the impeller 40 can be reduced.

As a result, a larger amount of fluid per unit time can be moved to the rear side of the bracket 30.

As a result, a volume per unit time of fluid flowing toward the rear side of the bracket 30 by the impeller 40 can be increased.

As a result, a flow rate of fluid flowing toward the rear side of the bracket 30 by the impeller 40 can be increased.

In addition, the plurality of bracket coupling portions 32 can be positioned to overlap with the plurality of protrusions 52 of the printed circuit board 61 in the axial direction.

In some implementations, three bracket coupling portions 32 can be provided. The three bracket coupling portions 32 can form with each other a predetermined angle and each can protrude radially outward from the outer circumferential surface of the bracket body portion 31.

In some implementations, the number of bracket coupling portions 32 can be provided in different plurality of numbers.

Each of the protrusions 52 can extend in a direction in which each of the bracket coupling portions 32 protrude.

Accordingly, the plurality of bracket coupling portions 32 and the plurality of protrusions 62 can overlap in the axial direction.

Accordingly, spaces between each of the plurality of bracket coupling portions 32 and the concave portions 63 between each of the plurality of protrusions 62 can overlap in the axial direction.

Accordingly, the bracket 30 can overlap the printed circuit board 61 in the axial direction.

Thereby, fluid that has passed through the flow path F to move downstream can pass through spaces between each of the bracket coupling portions 32 and the concave portions 63.

For example, the fluid moved downstream through the flow path F can pass through the spaces between each of the bracket coupling portions 32 and the concave portions 63 without colliding with the bracket 30 and the printed circuit board 61.

As a result, an overall flow resistance on the path through which the fluid flows can be reduced.

A comparison between a case where an entire bracket 30 overlaps the printed circuit board 61 in the axial direction and a case where a portion of the bracket 30 overlaps the printed circuit board 61 in the axial direction is described below.

First, when a portion of the bracket 30 overlaps the printed circuit board 61 in the axial direction, a portion of the bracket 30 can overlap the concave portions 63 provided between each of the plurality of protrusions 62 in the axial direction.

For example, the bracket coupling portions 32 can overlap the concave portions 63 in the axial direction. Then, fluid moving downstream along outer circumferential surfaces of the bracket coupling portions 32 passes through the concave portions 63.

In some implementations, when the entire bracket 30 overlaps the printed circuit board 61 in the axial direction, fluid introduced into the spaces between each of the bracket coupling portions 32 can pass through the concave portions 63.

Compared with the case where the fluid flows along the outer circumferential surface of the bracket coupling portions 32, a larger amount of fluid can flow when the fluid flows into the spaces between each of the plurality of bracket coupling portions 32.

Accordingly, when the entire bracket 30 overlaps the printed circuit board 61 in the axial direction, an amount of fluid flowing through the concave portions 63 without colliding with the printed circuit board 61 can be increased.

As a result, compared with the case where a portion of the bracket 30 overlaps the printed circuit board 61 in the axial direction, a volume per unit time of the fluid flowing toward the rear side of the bracket 30 by the impeller 40 can be increased.

Therefore, compared with the case where a portion of the bracket 30 overlaps the printed circuit board 61 in the axial direction, a flow rate of the fluid flowing to the rear side of the bracket 30 by the impeller 40 can be increased.

Since the protrusions 62 and the bracket coupling portions 32 overlap in the axial direction, the connection pins 65 extending from a radially outer side of the protrusions 62 toward the power portion 20 pass through the bracket coupling portions 32 to be coupled with the insulator 213.

The connection pins 65 passed through the bracket coupling portions 32 to be coupled with the insulator 213 are electrically connected to the stator coil 212.

Each portion of the bracket coupling portions 32 extending toward the power portion 20 can be provided with connection pin receiving holes 323 provided therethrough in the axial direction to receive the connection pins 65.

Except for the above differences, as the motor 5 can be similar in the configuration and the effect to the motor 1, the configuration of the motor 5 without description can be understood with reference to the description of the motor 1.

Figure 11:
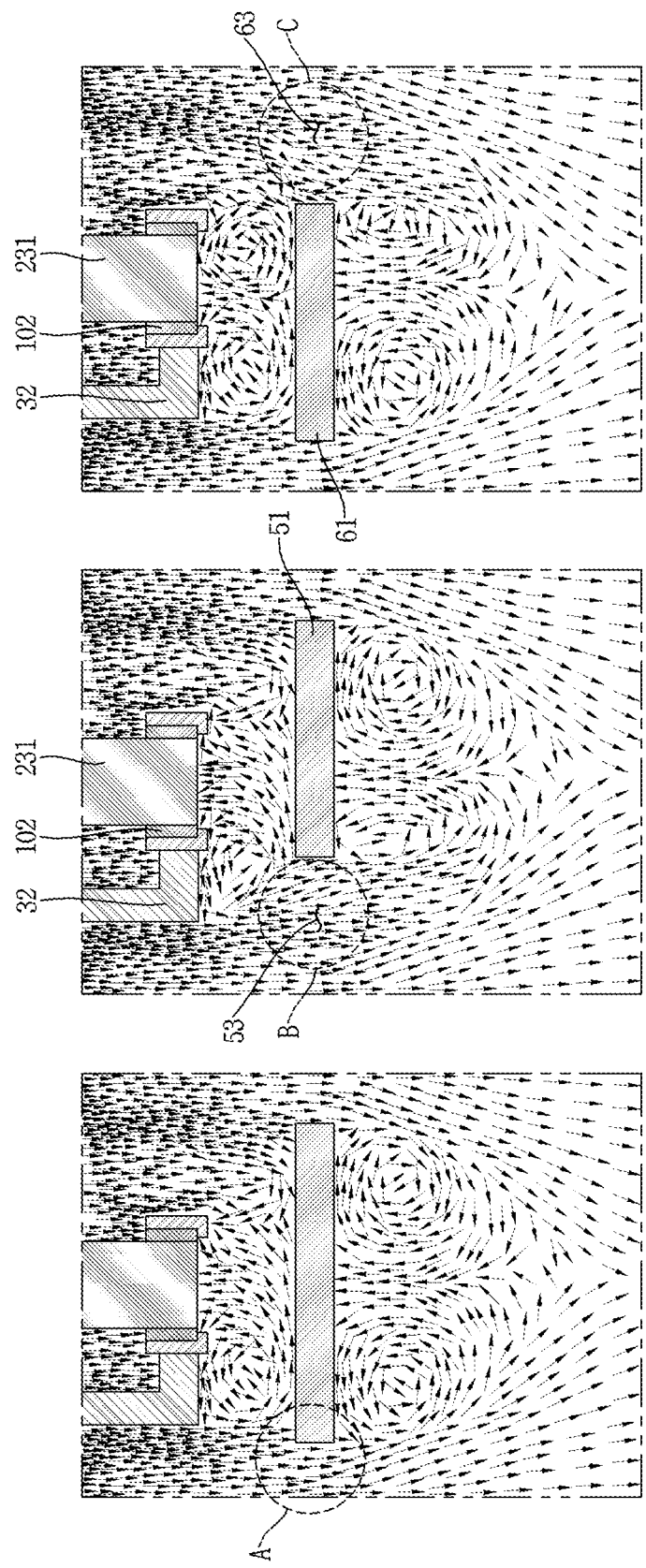
FIGS. 11A-C are diagrams illustrating a conceptual view of a state in which fluid flows in a flow path provided in a conventional motor and a state in which fluid flows in a flow path provided in an exemplary motor.

Referring to FIGS. 11A-C, an increase in volume of fluid due to concave portions will be described.

FIGS. 11A-C are conceptual views illustrating cross sections of a portion of a bracket and a printed circuit board and a flow of fluid around the bracket.

Referring to FIG. 11A, an example flow of fluid in a motor provided with a circular printed circuit board without a concave portion according to a conventional motor is illustrated.

Figure 5:
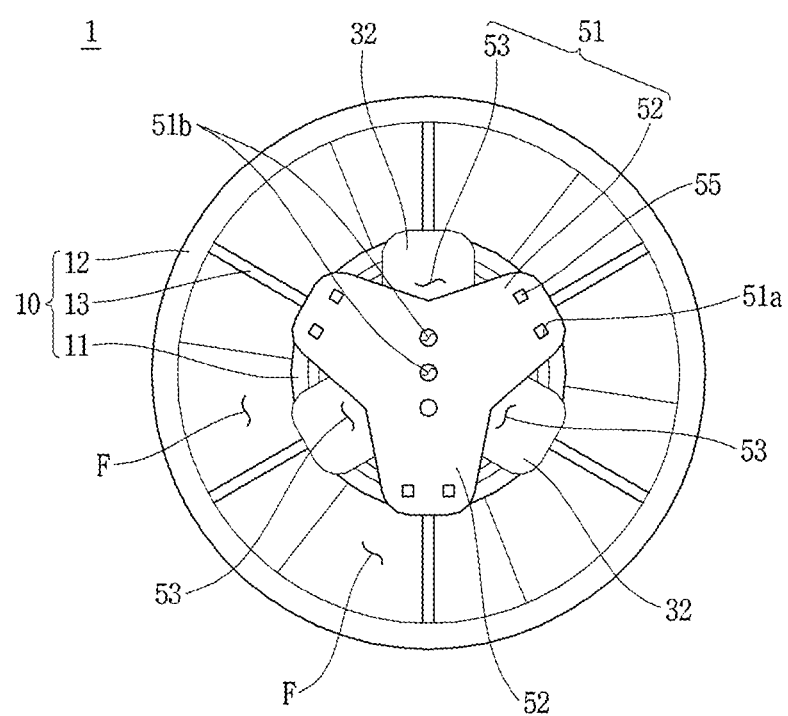
FIG. 5 is a diagram illustrating a bottom view of the exemplary motor of FIG. 3.

Referring to FIG. 11B, an example flow of fluid in the motor 1 in FIG. 5 is illustrated.

Referring to FIG. 11C, an example flow of fluid in the motor 5 in FIG. 9 is illustrated.

In FIG. 11A, a rod shape extending in a left-right direction at a central portion of the drawing is a printed circuit board.

Referring to FIG. 11A, fluid passing through a flow path in an area A collides with a portion of the printed circuit board that is adjacent to an outer circumferential surface of the printed circuit board.

For example, the fluid loses a predetermined energy after colliding with the printed circuit board, then moves downstream by bypassing the printed circuit board.

Accordingly, a flow resistance due to the printed circuit board can be increased.

As a result, a flow rate of the fluid moved by the impeller can decrease.

Referring to FIG. 11B, fluid that has passed through a flow path F in an area B can pass along outer sides of the bracket coupling portions 32, and then can pass through the concave portions 53 without colliding with the printed circuit board 51.

Accordingly, an amount of fluid passing through the printed circuit board 51 without colliding with the printed circuit board 51 can be increased.

Accordingly, a flow resistance caused by the printed circuit board can be reduced.

As a result, a flow rate of the fluid moved by the impeller 40 can be increased.

Referring to FIG. 11C, a space between the bracket coupling portions 32 adjacent to each other can overlap the concave portion 63 in the axial direction.

Therefore, a fluid flowing through the space between the bracket coupling portions 32 can be moved to an area C where the concave portion 63 is provided, and the fluid moved to the area C can flow downstream without colliding with the printed circuit board 61.

Accordingly, a flow resistance that can be generated when fluid flowing through the space between the bracket coupling portions 32 collides with the printed circuit board 61 can be reduced.

As a result, a flow rate of the fluid flowing downstream can be increased.

Referring to FIGS. 11B and 11C, a volume of the fluid flowing by the impeller can be increased without an additional member but with a simple change such as a partial change of a shape of the printed circuit board or an adjustment of a direction in which the bracket is installed.

Figure 12:
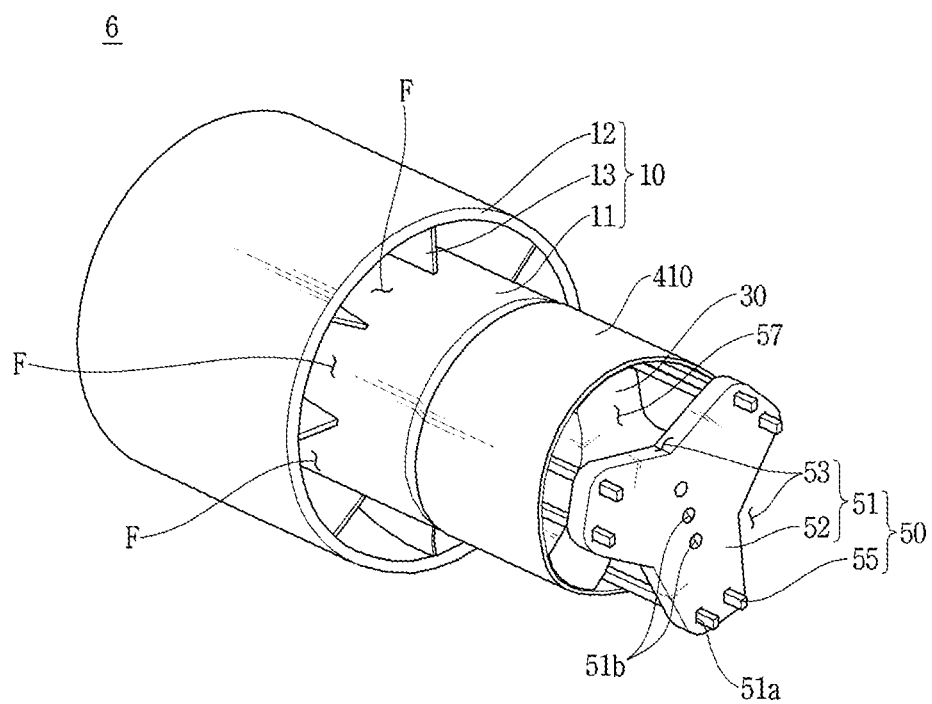
FIG. 12 is a diagram illustrating a perspective view of an exemplary motor.
Figure 13:
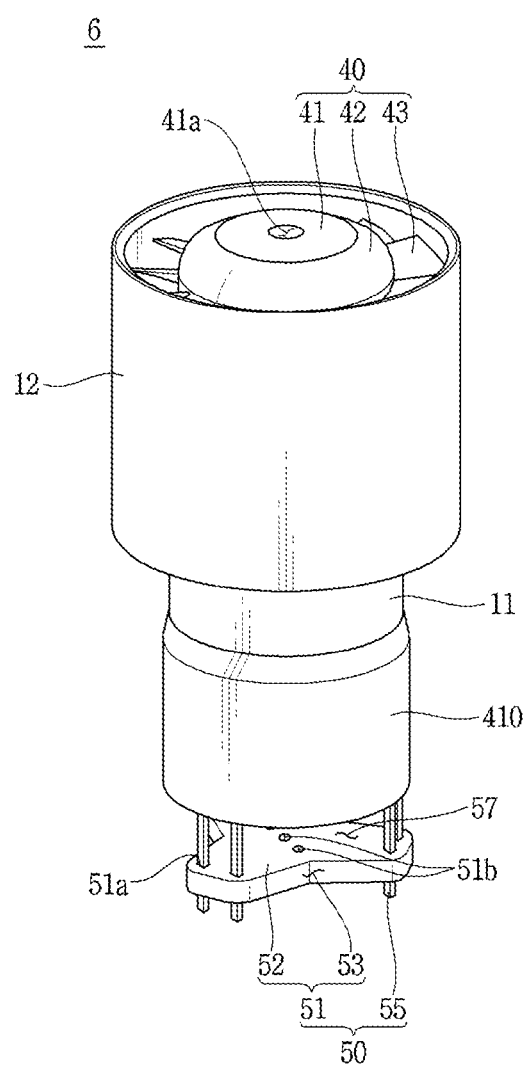
FIG. 13 is a diagram illustrating a perspective view of the exemplary motor.

A motor 6 will be described with reference to FIGS. 12 and 13.

Compared with the motor 1 of the above-described implementation, the motor 6 can have the following differences.

The motor 6 can include a shielding member 410 configured to block fluid that has passed through a flow path F from being moved toward the bracket 30.

The shielding member 410 can be provided with a predetermined space defined therethrough in the axial direction. The bracket 30 can be accommodated in the predetermined space.

In some implementations, the shielding member 410 can have a cylindrical shape. For example, the shielding member 410 can have a hollow shape with both sides thereof being opened in the axial direction.

A front side of the shielding member 410 can be coupled to a rear side of the inner housing 11.

In some implementations, a front inner circumferential surface of the shielding member 410 can surround a rear outer circumferential surface of the inner housing 11. The inner circumferential surface of the shielding member 410 and the outer circumferential surface of the inner housing 11 in contact with each other can be coupled to each other, whereby the shielding member 410 and the inner housing 11 can be coupled to each other.

Since the inner circumferential surface of the shielding member 410 can be coupled by surrounding the outer circumferential surface of the inner housing 11 in a circumferential direction, fluid passed through a flow path F can be suppressed from being introduced into a coupled portion between the shielding member 410 and the inner housing 11.

Accordingly, the fluid that has passed through the flow path F may not move toward the bracket 30 but move downstream along an outer circumferential surface of the shielding member 410.

Here, in order to improve an efficiency of the fluid flowing along the outer circumferential surface of the shielding member 410, it is preferable that the outer circumferential surface of the shielding member 410 extends in a flow direction of the fluid without protruding radially outward and without being recessed radially inward.

Accordingly, the fluid passed through the flow path F can move downstream along the outer circumferential surface of the smooth shielding member 410, whereby an overall flow resistance on a path through which the fluid moves can be reduced.

Accordingly, a flow resistance due to a protrusion and/or recessed portion present in the flow path can be reduced.

Therefore, an amount of fluid flowing downstream per unit time can be increased.

As a result, a flow rate of the fluid flowing downstream by the impeller 40 can be increased.

In order to limit the fluid passed through the flow path F from moving toward the bracket 30, the shielding member 410 can accommodate the entire bracket 30 in an inner space thereof.

An axial length of the shielding member 410 can be longer than an axial length of the bracket 30.

Since the bracket 30 is completely accommodated in the inner space of the shielding member 410, the bracket 30 can overlap the shielding member 410 in the radial direction.

As described above, in some implementations, the shielding member 410 can be coupled to the inner housing 11 by surrounding the rear outer circumferential surface of the inner housing 11.

In some implementations, the inner housing 11 and the shielding member 410 can be integrally provided. For example, the inner housing 11 can extend rearwardly with a length capable of accommodating the entire bracket 30. The entire bracket 30 can be accommodated in the inner space of the inner housing 11, whereby the fluid that has passed through the flow path F can be suppressed from moving toward the bracket 30.

In some implementations, since a spacing 57 is defined between the shielding member 410 and the printed circuit board 51, heat generated between the rotation shaft 231 and the second bearing 102 accommodated in the bracket 30 (see FIG. 4) can be effectively radiated. Further, heat generated from the power portion 20 can be radiated through the spacing 57.

Except for the above differences, as the motor 6 is similar in the configuration and the effect to the motor 1, the configuration of the motor 6 without description can be understood with reference to the description of the motor 1.

Figure 14:
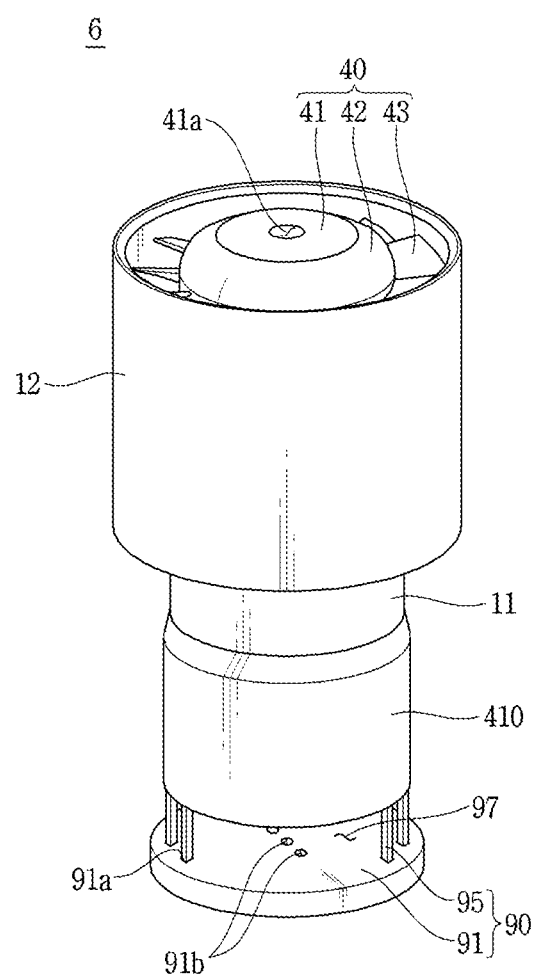
FIG. 14 is a diagram illustrating a perspective view of the exemplary motor.

Referring to FIG. 14, a modified example of the motor 6 is illustrated. In some implementations, a circular printed circuit board 91 can be employed instead of the printed circuit board 51 provided with the protrusions 52 and the concave portions 53 of the motor 1.

Figure 15:
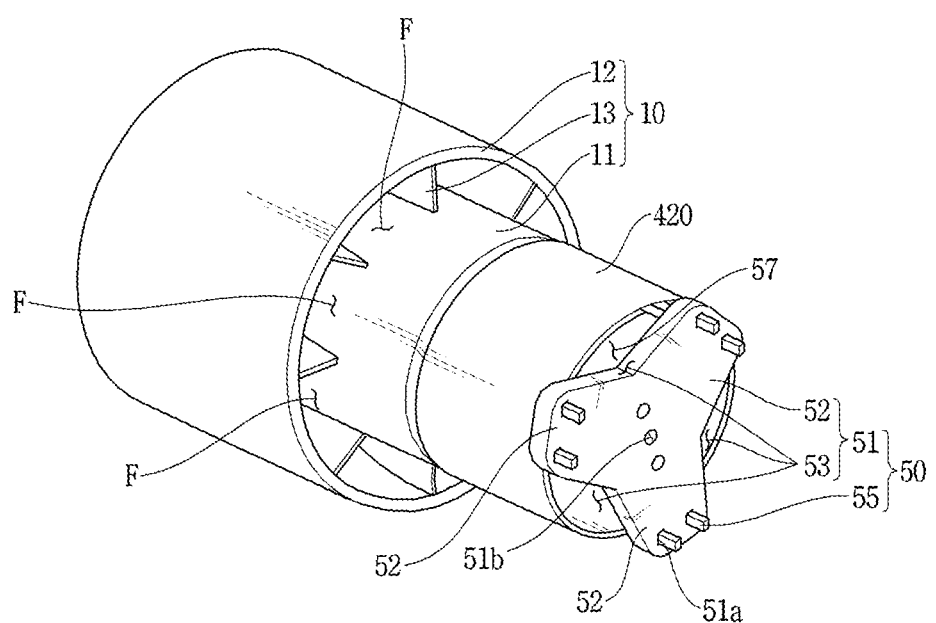
FIG. 15 is a diagram illustrating a perspective view of an exemplary motor.
Figure 16:
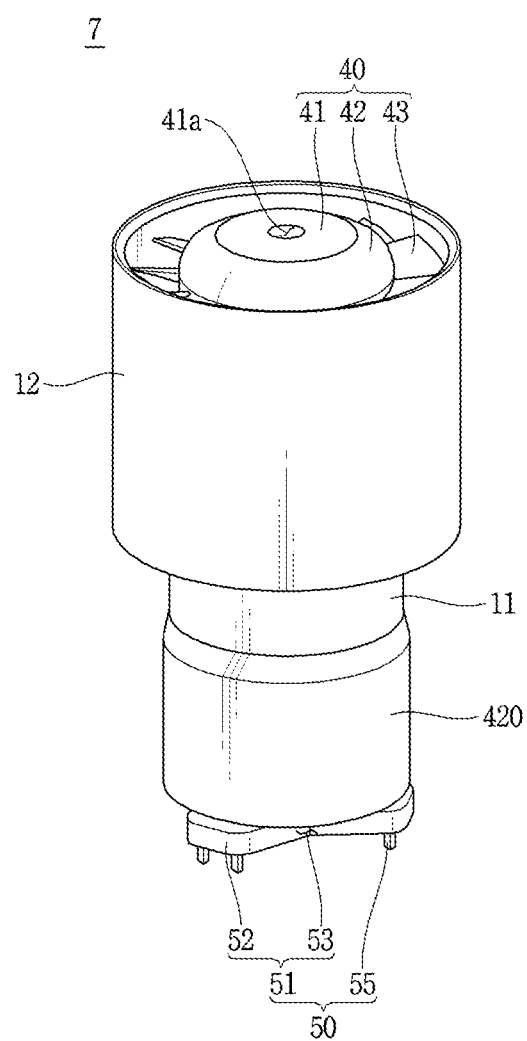
FIG. 16 is a diagram illustrating a perspective view of the exemplary motor of FIG. 15.

A motor 7 will be described with reference to FIGS. 15 and 16.

Compared with the motor 6, the motor 7 can have the following differences.

A shielding member 420 provided in the motor 7 can accommodate not only the bracket 30 but also a spacing 57 defined between the bracket 30 and the printed circuit board 51.

The bracket 30 and the spacing 57 can be accommodated in a space defined through the shielding member 420 in the axial direction. Accordingly, the bracket 30 and the spacing 57 may not exposed outwardly.

Since the bracket 30 and the spacing 57 are completely accommodated in the space defined through the shielding member 420, the bracket 30 and the spacing 57 can overlap the shielding member 420 in the radial direction.

The fluid passed through the flow path F can move downstream along an outer circumferential surface of the smooth shielding member 420, whereby an overall flow resistance on a path through which the fluid moves can be reduced.

Accordingly, a flow resistance due to a protrusion and/or recessed portion present in the flow path can be reduced.

Therefore, an amount of fluid flowing downstream per unit time can be increased.

As a result, a flow rate of the fluid flowing downstream by the impeller 40 can be increased.

For example, since the shielding member 420 surrounds up to the spacing 57, fluid moved downstream along the outer circumferential surface of the shielding member 420 to move to the spacing 57 can be blocked from creating a vortex or colliding with the printed circuit board 51.

As a result, noise due to a vortex and a flow resistance on a path through which fluid moves can be reduced.

For example, a flow rate of the fluid flowing downstream by the impeller 40 can be increased while an amount of noise generated by the flow of the fluid is reduced.

Figure 17:
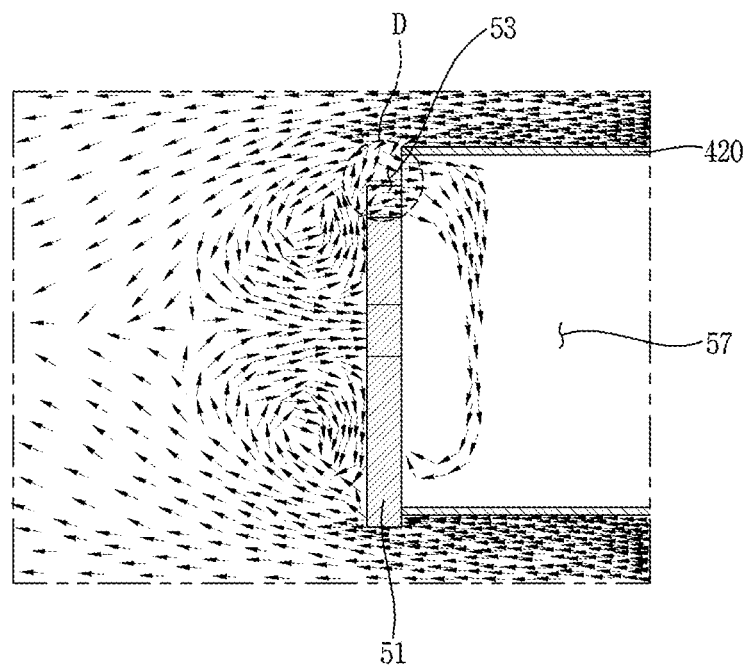
FIG. 17 is a diagram illustrating a conceptual view of a state in which fluid flows in a flow path provided in the exemplary motor of FIG. 16.

Referring to FIG. 17, a flow of fluid at a downstream side of the motor 7, for example, at a portion where the printed circuit board 51 is located is illustrated.

Referring to an area D in FIG. 17, fluid that has passed through a flow path F does not flow toward the spacing 57 but can flow downstream along the outer circumferential surface of the shielding member 420.

However, depending on an operation environment of the motor 7, a portion of the fluid can flow into the spacing 57 of the shielding member 420 through a portion where the concave portions 53 are provided.

For example, a vortex can be created by the fluid introduced into the spacing 57.

Figure 18:
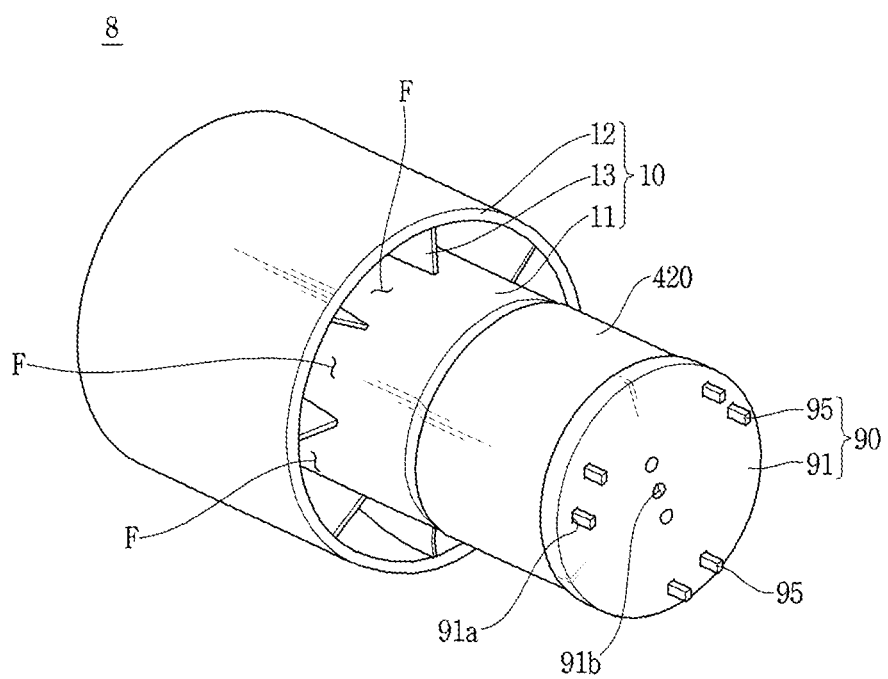
FIG. 18 is a diagram illustrating a perspective view of an exemplary motor.

Referring to FIG. 18, a modified example of the motor 7 is illustrated. In some implementations, the circular printed circuit board 91 can be employed instead of the printed circuit board 51 provided with the protrusions 52 and the concave portions 53 of the motor 1.

Accordingly, a portion of the fluid flowing downstream to be introduced into the spacing 57 through a portion where the concave portions 53 are provided can be blocked from creating a vortex.

Figure 19:
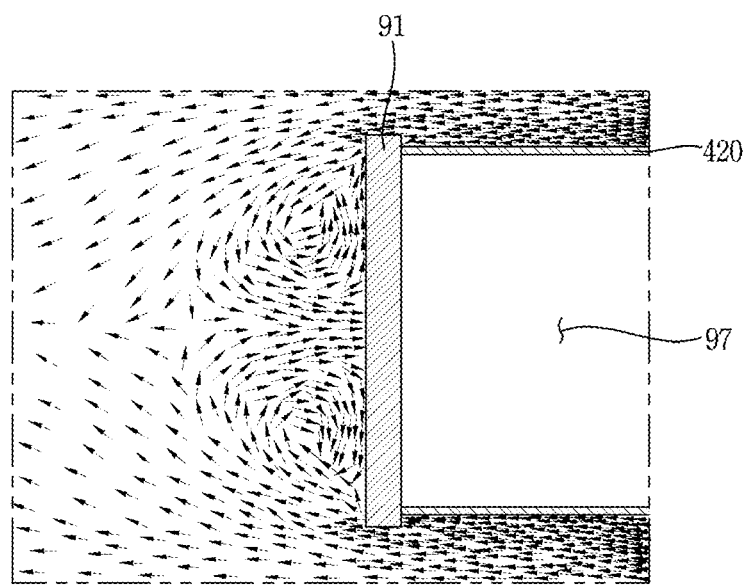
FIG. 19 is a diagram illustrating a conceptual view of a state in which fluid flows in a flow path provided in the exemplary motor of FIG. 18.

Referring to FIG. 19, a flow of fluid at a downstream side of a motor 8, for example, a portion where the printed circuit board 91 is located is illustrated.

The fluid passing through the flow path F moves downstream along the outer circumferential surface of the smooth shielding member 420, whereby an overall flow resistance on a path through which the fluid moves can be reduced.

Accordingly, a flow resistance due to a protrusion and/or recessed portion present in the flow path can be reduced.

Therefore, an amount of fluid flowing downstream per unit time can be increased.

As a result, a flow rate of the fluid flowing downstream by the impeller 40 can be increased.

In some implementations, a spacing 97 can be sealed by the printed circuit board 91.

Accordingly, fluid can be suppressed from being introduced into the spacing 97 while moving along the outer circumferential surface of the shielding member 420.

Therefore, the fluid can be suppressed from being introduced into the spacing 97 while moving along the outer circumferential surface of the shielding member 420 to create a vortex. As a result, noise generated during an operation of the motor 8 can be reduced.

In some implementations, an open rear side of the shielding member 420 can be covered by the circular printed circuit board 91.

Accordingly, fluid moved to the rear side of the shielding member 420 along the outer circumferential surface of the shielding member 420 can be suppressed from being introduced into the spacing 97. Thereby, a creation of a vortex can be suppressed.

As a result, noise generated during an operation of the motor 8 can be reduced.

For example, the motor 8 can increase the flow rate of the fluid flowing downstream and reduce noise at the same time.

Except for the above differences, as the motor 7 or the motor 8 is similar in the configuration and the effect to the motor 6, the configuration of the motor 7 or the motor 8 without description can be understood with reference to the description of the motor 6.

Figure 20:
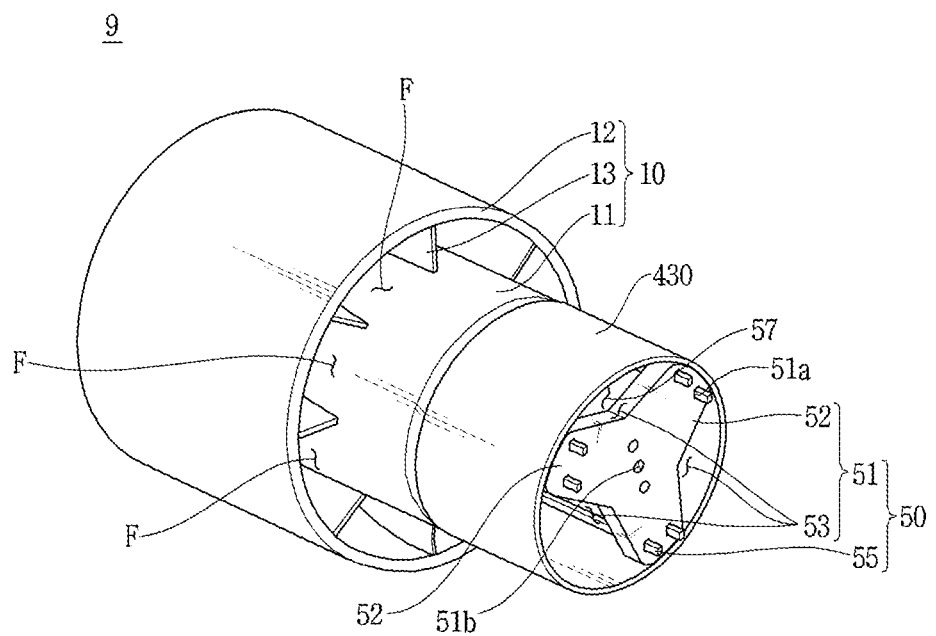
FIG. 20 is a diagram illustrating a perspective view of an exemplary motor.

A motor 9 will be described with reference to FIG. 20.

Compared with the motor 7, the motor 9 can have the following differences.

A shielding member 430 provided in the motor 9 can accommodate the printed circuit board 51.

For example, the printed circuit board 51 can be completely accommodated in a space defined through the shielding member 430 in the axial direction.

Since the printed circuit board 51 is accommodated in the shielding member 430, the printed circuit board 51 can overlap the shielding member 430 in the radial direction.

In some implementations, fluid passing through the flow path F can move downstream along an outer circumferential surface of the smooth shielding member 430, whereby an overall flow resistance on the path through which the fluid moves can be reduced.

In some implementations, since the shielding member 430 surrounds up to the spacing 57, fluid moved downstream along an outer circumferential surface of the shielding member 430 to move to the spacing 57 can be blocked from creating a vortex or colliding with the printed circuit board 51.

Accordingly, noise and a flow resistance on a path through which fluid moves can be reduced. For example, a flow rate of the fluid flowing downstream by the impeller 40 can be increased while an amount of noise generated by the flow of the fluid is reduced.

Depending on an operation condition of the motor, when there is a gap in the path through which fluid flows, the fluid can be introduced into the gap or the path can be changed by the gap.

In some implementations, since the printed circuit board 51 is completely accommodated in the shielding member 430, there can be no gap between the printed circuit board 51 and the shielding member 430 on the path through which fluid is moved downstream along the outer circumferential surface of the shielding member 430.

Accordingly, a flow resistance that can be occurred by a process in which fluid flows along the outer circumferential surface of the shielding member 430 can be reduced. As a result, an overall flow rate of the fluid flowing by the impeller 40 can be increased.

Figure 21:
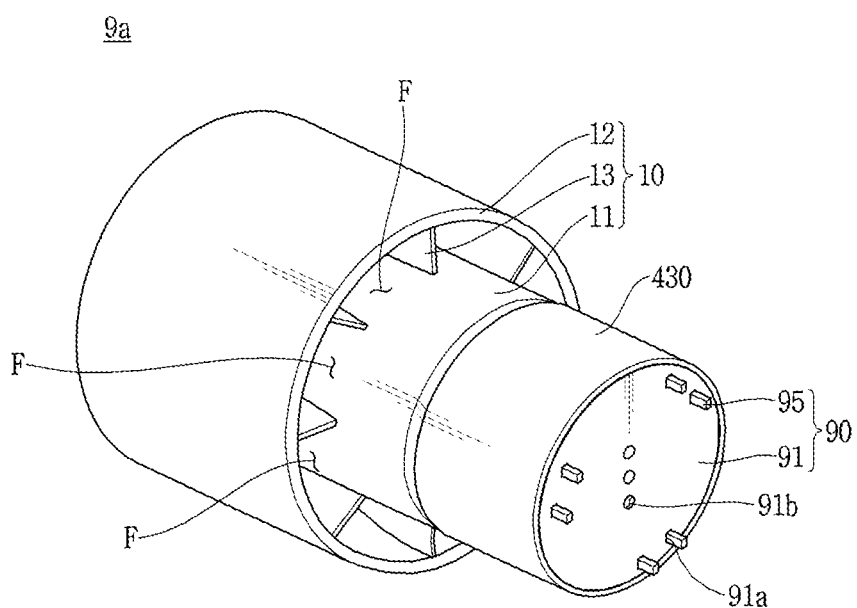
FIG. 21 is a diagram illustrating a perspective view of an exemplary motor.

Referring to FIG. 21, a modified example of the motor 9 is illustrated. In a motor 9a illustrated in FIG. 18, the circular printed circuit board 91 can be employed instead of the printed circuit board 51 provided with the protrusions 52 and the concave portions 53.

Accordingly, a portion of fluid flowing downstream through a portion where the concave portions 53 are provided flows to a front side of the printed circuit board 51 to create a vortex can be suppressed. For example, an occurrence of noise can be suppressed.

Further, an outer circumferential surface of the printed circuit board 91 can be brought into contact with an inner circumferential surface of the shielding member 430 in a circumferential direction.

As a result, that a portion of fluid flowing downstream through a gap between the printed circuit board 91 and the shielding member 430 to create a vortex in the shielding member 430 can be suppressed.

Except for the above differences, as the motor 9 or the motor 9a is similar in the configuration and the effect to the motor 7 and the motor 8, the configuration of the motor 9 or the motor 9a without description can be understood with reference to the description of the motor 7 and the motor 8.

What is claimed is:

1. A motor, comprising:
an inner housing defining an accommodation space;
an outer housing defining a flow path with the inner housing;
an impeller disposed at a first side of the inner housing;
a power portion that is disposed in the accommodation space and that includes a rotation shaft coupled to the impeller so as to be rotated together with the impeller;
a bracket coupled to the inner housing at a second side of the inner housing and rotatably supporting the rotation shaft; and
a printed circuit board (PCB) that is spaced apart from the bracket by a predetermined distance and that is electrically connected to the power portion,
wherein a circumference of the PCB includes a plurality of concave portions that are spaced apart from each other,
wherein the plurality of concave portions are recessed toward a center of the PCB such that fluid flowing by the impeller moves downstream by passing through the plurality of concave portions, wherein the PCB includes a plurality of protrusions that protrude radially outward and that define a predetermined angle with each other, wherein each end portion of the plurality of protrusions includes a plurality of connection pins extending toward the power portion, wherein the plurality of connection pins are electrically coupled to the power portion, wherein the bracket comprises:
  a bracket body portion configured to accommodate the rotation shaft to rotatably support the rotation shaft, and
  a plurality of bracket coupling portions protruding from an outer circumferential surface of the bracket body portion and extending toward the inner housing, and wherein the plurality of connection pins extend toward the power portion between the bracket coupling portions adjacent to each other among the plurality of bracket coupling portions.

2. The motor of claim 1, wherein each of the plurality of concave portions is provided between the plurality of protrusions that are adjacent to each other in a circumferential direction.

3. The motor of claim 1, wherein the plurality of concave portions curve toward the center of the PCB.

4. The motor of claim 1, wherein a portion of the plurality of concave portions that is closest to the center of the PCB is angled.

5. The motor of claim 1 wherein the power portion comprises:
  a stator core that is spaced apart from the rotation shaft by a predetermined distance to surround the rotation shaft and that is coupled to the inner housing;
  a stator coil wound around the stator core; and
  an insulator coupled to the stator core between the stator core and the stator coil, wherein a plurality of connection pin coupling portions are provided to protrude from an outer circumferential surface of a portion of the insulator facing the PCB, and wherein the plurality of connection pins are inserted into the plurality of connection pin coupling portions to be electrically connected to the stator coil.

6. The motor of claim 1, wherein the plurality of bracket coupling portions do not overlap the plurality of protrusions in an axial direction.

7. A motor, comprising:
  an inner housing defining an accommodation space;
  an outer housing defining a flow path with the inner housing;
  an impeller provided at a first side of the inner housing;
  a power portion that is disposed in the accommodation space and that includes a rotation shaft coupled to the impeller so as to be rotated together with the impeller;
  a bracket coupled to the inner housing at a second side of the inner housing and rotatably supporting the rotation shaft; and
  a printed circuit board (PCB) that is spaced apart from the bracket by a predetermined distance and that is electrically connected to the power portion, wherein the PCB includes a plurality of protrusions that protrude radially outward and that have a predetermined angle with each other, wherein the bracket comprises:
  a bracket body portion configured to accommodate the rotation shaft to rotatably support the rotation shaft; and
  a plurality of bracket coupling portions protruding from an outer circumferential surface of the bracket body portion and extending toward the inner housing, wherein the plurality of bracket coupling portions overlap the plurality of protrusions in an axial direction, wherein each of a plurality of concave portions is provided between the plurality of protrusions that are adjacent to each other in a circumferential direction, and wherein the plurality of concave portions are recessed toward a center of the PCB such that fluid flowing by the impeller moves downstream by passing through the plurality of concave portions.

8. The motor of claim 7, wherein a circumferential surface of each of the plurality of protrusions that surround the plurality of concave portions is curved toward the center of the PCB.

9. The motor of claim 7, wherein a portion of the plurality of concave portions that is closest to the center of the PCB is angled.

10. The motor of claim 7, wherein the plurality of bracket coupling portions are coupled to (i) the second side of the inner housing or (ii) the power portion.

11. The motor of claim 10, wherein each end portion of the plurality of protrusions includes a plurality of connection pins extending toward the power portion.

12. The motor of claim 11, wherein the plurality of connection pins pass through the plurality of bracket coupling portions to be electrically connected to the power portion.

13. The motor of claim 7, wherein the bracket body portion has a cylindrical shape.

14. The motor of claim 7, wherein the plurality of bracket coupling portions are spaced apart from each other.

* * * * *